United States Patent
Tretbar et al.

(10) Patent No.: US 11,061,477 B2
(45) Date of Patent: Jul. 13, 2021

(54) DISPLAY DEVICES AND PIXEL FOR A DISPLAY DEVICE

(71) Applicant: FRAUNHOFER-GESELLSCHAFT ZUR FOERDERUNG DER ANGEWAN, Munich (DE)

(72) Inventors: Steffen Tretbar, Sulzbach/Saar (DE); Daniel Schmitt, Sulzbach/Saar (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/631,477

(22) PCT Filed: Jun. 12, 2018

(86) PCT No.: PCT/EP2018/065485
§ 371 (c)(1),
(2) Date: Jan. 16, 2020

(87) PCT Pub. No.: WO2019/015882
PCT Pub. Date: Jan. 24, 2019

(65) Prior Publication Data
US 2020/0209969 A1 Jul. 2, 2020

(30) Foreign Application Priority Data
Jul. 17, 2017 (DE) .................. 10 2017 116 012.4

(51) Int. Cl.
*G06F 3/045* (2006.01)
*G06F 3/01* (2006.01)
(Continued)

(52) U.S. Cl.
CPC .............. *G06F 3/016* (2013.01); *G06F 3/043* (2013.01); *G06F 3/0447* (2019.05); *H04R 1/028* (2013.01);
(Continued)

(58) Field of Classification Search
CPC . G06F 3/01; G06F 3/016; G06F 3/017; G06F 3/0412; G06F 3/043; G06F 3/044;
(Continued)

(56) References Cited

U.S. PATENT DOCUMENTS

2009/0250267 A1* 10/2009 Heubel ............... G06F 3/04886
178/18.03
2010/0328053 A1* 12/2010 Yeh .......................... G06F 3/016
340/407.2
(Continued)

FOREIGN PATENT DOCUMENTS

DE 102012208355 A1 11/2013
DE 102016210217 A1 12/2017
(Continued)

OTHER PUBLICATIONS

"Ultra Haptics: Multi-Point Mid-Air Haptic Feedback for Touch Surfaces", Carter et al., 2013, 10 pages.
(Continued)

*Primary Examiner* — Joe H Cheng
(74) *Attorney, Agent, or Firm* — 2SPL Patent Attorneys PartG mbB; Kieran O'Leary

(57) ABSTRACT

A display device is disclosed. The display device comprises an optical structure with a plurality of pixels configured to generate an optical image on a front side of the optical structure. The display device further includes a plurality of acoustic transducers configured to generate an acoustic field for stimulating the tactile sense of a human person based on a plurality of control signals in a space in front of the front side of the optical structure. The plurality of acoustic transducers are located on a back side of the optical structure. The display device further includes a control circuit configured
(Continued)

to generate at least one of the plurality of control signals based on at least one acoustic property of the optical structure.

17 Claims, 3 Drawing Sheets

(51) Int. Cl.
| | |
|---|---|
| G06F 3/044 | (2006.01) |
| G06F 3/043 | (2006.01) |
| H04R 1/02 | (2006.01) |
| H04R 1/40 | (2006.01) |
| H04R 3/12 | (2006.01) |

(52) U.S. Cl.
CPC ............... H04R 1/403 (2013.01); H04R 3/12 (2013.01); *G06F 2203/04106* (2013.01); *H04R 2400/03* (2013.01); *H04R 2499/15* (2013.01)

(58) Field of Classification Search
CPC ......... G06F 3/0447; H04R 1/02; H04R 1/028; H04R 1/40; H04R 1/403; H04R 3/12; G10K 11/34
See application file for complete search history.

(56) References Cited

U.S. PATENT DOCUMENTS

| | | | | |
|---|---|---|---|---|
| 2011/0102341 | A1* | 5/2011 | Imai | G06F 3/041 |
| | | | | 345/173 |
| 2011/0199342 | A1 | 8/2011 | Vartanian et al. | |
| 2011/0310028 | A1* | 12/2011 | Camp, Jr. | G06F 3/016 |
| | | | | 345/173 |
| 2012/0229401 | A1* | 9/2012 | Birnbaum | G06F 3/016 |
| | | | | 345/173 |
| 2012/0299853 | A1* | 11/2012 | Dagar | G09B 21/003 |
| | | | | 345/173 |
| 2013/0113760 | A1 | 5/2013 | Gossweiler, III et al. | |
| 2014/0340209 | A1* | 11/2014 | Lacroix | H04R 3/14 |
| | | | | 340/407.2 |
| 2015/0007025 | A1* | 1/2015 | Sassi | G06F 3/0488 |
| | | | | 715/702 |
| 2015/0070147 | A1* | 3/2015 | Cruz-Hernandez | G10L 21/16 |
| | | | | 340/407.1 |
| 2015/0123949 | A1* | 5/2015 | Li | G06F 3/0488 |
| | | | | 345/177 |
| 2015/0130323 | A1* | 5/2015 | Harris | G06F 3/0436 |
| | | | | 310/311 |
| 2015/0145657 | A1* | 5/2015 | Levesque | G06F 3/016 |
| | | | | 340/407.2 |
| 2015/0192995 | A1 | 7/2015 | Subramanian et al. | |
| 2015/0277610 | A1* | 10/2015 | Kim | G06F 3/016 |
| | | | | 345/173 |
| 2016/0124080 | A1 | 5/2016 | Carter et al. | |
| 2016/0180636 | A1* | 6/2016 | David | G07F 17/3206 |
| | | | | 463/32 |
| 2016/0249150 | A1* | 8/2016 | Carter | H04R 1/40 |
| 2016/0282808 | A1 | 9/2016 | Smalley | |
| 2017/0123499 | A1* | 5/2017 | Eid | G10K 15/00 |
| 2017/0366908 | A1 | 12/2017 | Long et al. | |

FOREIGN PATENT DOCUMENTS

| | | |
|---|---|---|
| EP | 3206109 A1 | 8/2017 |
| GB | 2513884 A | 11/2014 |
| JP | 2012-048378 A | 3/2012 |

OTHER PUBLICATIONS

"Design of a tactile display based on a high power CMUT array", Chouvardas et al., 2012, 6 pages.
"High-resolution Ultrasonic Gesture Tracking Systems for Future Portable Devices", Dahl et al., 2012, 4 pages.
"Aerial Display of Vibrotactile Sensation with High Spatial-Temporal Resolution using Large-Aperture Airborne Ultrasound Phased Array", Hasegawa et al., 2013, 6 pages.
"Active Touch Perception Produced by Airborne Ultrasonic Haptic Hologram", Inoue et al., 2015, 6 pages.
"Non-contact Method for Producing Tactile Sensation Using Airborne Ultrasound", Iwamoto et al., 2008, 10 pages.
"HaptoMime: Mid-Air Haptic Interaction with a Floating Virtual Screen", Monnai et al., 2014, 5 pages.
"A Photoacoustic Imager With Light Illumination Through an Infrared-Transparent Silicon CMUT Array", Chen et al., 2012, 10 pages.
"Implementation of ultrasonic touchless interactive panel using the polymer-based CMUT array", Chiu et al., 2009, 6 pages.
"Applications of airborne ultrasound in human-computer interaction", Dahl et al., 2014, 10 pages.
"Ultrasonic Fingerprint Sensor With Transmit Beamforming Based on a PMUT Array Bonded to CMOS Circuitry", Jiang et al., 2016, 9 pages.
"A CMUT Probe for Medical Ultrasonography: From Microfabrication to System Integration", Savoia et al., 2012, 12 pages.
"CMUTs on Glass with ITO Bottom Electrodes for Improved Transparency", Zhang et al., 2019, 4 pages.

* cited by examiner

DISPLAY DEVICES AND PIXEL FOR A DISPLAY DEVICE

CROSS REFERENCE TO RELATED APPLICATIONS

This application is a national stage of PCT/EP2018/065485, filed on Jun. 12, 2018 and claims priority to Germany Application No. 10 2017 116 012.4, filed on Jul. 17, 2017, the contents of which is incorporated by reference herein.

TECHNICAL FIELD

Embodiments relate to display devices with haptic feedback. In particular, embodiments relate to display devices and a pixel for a display device.

BACKGROUND

Freely configurable graphical user interfaces for finger operation (also referred to as "touch screen") are increasingly replacing conventional operating elements in devices and instruments used in everyday life (e.g. mobile phone, coffee machine or car). There, e.g. classic sliders and rotary knobs are reproduced visually for intuitive operation. However, such purely graphical user interfaces lack haptics and, in particular, tactile feedback. If, for example, a virtual button was pressed, a virtual slider pushed to the upper stop or a virtual rotary knob rotated by half a rotation, often only an acoustic signal sometimes perceived as disturbing or a short vibration is output to acknowledge the execution.

In order to better integrate the human tactile sense into operating concepts, it should be possible for changing positions and shapes of graphically illustrated objects (e.g. buttons or sliders) to be flexibly tracked. This can be done, e.g., by mechanical vibrations or waves on the display surface and/or by radiation of ultrasonic waves into the air. Amplitude fluctuations in deflection or acoustic (sound) pressure can be detected with the human tactile sense. For example, a modulatable resistor for a human finger, that represents the position of a graphically illustrated (i.e. virtual) switch, can be generated that way.

This feedback via non-optical channels can be particularly important when the interaction with the graphical user interface takes place in front of the display or without contact with the same. For example, this is the case with holographic, three-dimensional displays.

Hence, there is a desire to provide a possibility for provision of tactile feedback.

SUMMARY

This desire is met by embodiments of a display device. The display device includes an optical structure with a plurality of pixels configured to generate an optical image on a front side of the optical structure. The display device further comprises a plurality of acoustic (sound) transducers configured to generate an acoustic (sound) field for stimulating the tactile sense of a human person based on a plurality of control signals in a space in front of the front side of the optical structure. The plurality of acoustic transducers are located on a back side of the optical structure. The display device further includes a control circuit configured to generate at least one of the plurality of control signals based on at least one acoustic property of the optical structure.

Embodiments further relate to a further display device. The display device includes an optical structure with a plurality of pixels configured to generate an optical image on a front side of the optical structure. The display device further comprises a plurality of acoustic transducers configured to generate an acoustic field for stimulating the tactile sense of a human person in a space in front of the front side of the optical structure. The plurality of acoustic transducers are located on the front side of the optical structure and are optically transparent for light with a wavelength in the range of 380 nm to 750 nm.

Embodiments also relate to a further display device. The display device includes an optical structure with a plurality of pixels configured to generate an optical image on a front side of the optical structure. The plurality of pixels are arranged on a carrier substrate of the optical structure. The display device further comprises a plurality of electromechanical transducers, configured to mechanically deform at least the carrier substrate based on a plurality of control signals such that an acoustic field for stimulating the tactile sense of a human person is formed in a space in front of the front side of the optical structure by the mechanical deformation of the carrier substrate.

Embodiments also relate to a pixel for a display device. The pixel includes a first subpixel configured to radiate red light based on a first control signal. In addition, the pixel includes a second subpixel configured to radiate blue light based on a second control signal. The pixel further includes a third subpixel configured to radiate green light based on a third control signal. The pixel further includes an acoustic transducer configured to radiate acoustic (sound) waves based on a fourth control signal.

Embodiments also relate to a display device comprising a plurality of previously mentioned pixels configured to generate an optical image on a front side of the display device. The display device further comprises a control circuit configured to generate a plurality of fourth control signals for the plurality of pixels such that the acoustic transducers of the plurality of pixels in a space in front of the front side of the display device generate an acoustic field for stimulating the tactile sense of a human person.

Finally, embodiments also relate to a further display device. The display device includes an optical structure with a plurality of pixels configured to generate an optical image on a front side of the optical structure. At least one of the plurality of pixels includes a first subpixel configured to radiate red light based on a first control signal. The pixel further includes a a second subpixel configured to radiate blue light based on a second control signal. The pixel further includes a third subpixel configured to radiate green light based on a third control signal and an acoustically transparent area. The display device further includes a plurality of acoustic transducers configured to generate an acoustic field for stimulating the tactile sense of a human person in a space in front of the front side of the optical structure. One of the plurality of acoustic transducers is arranged on a back side of the optical structure such that an area of the acoustic transducer in which it radiates acoustic waves at least partially covers the acoustically transparent area of the pixel.

BRIEF DESCRIPTION OF THE FIGURES

Embodiments are subsequently explained in more detail with reference to the accompanying figures, in which.

DESCRIPTION

Various embodiments will now be described in more detail with reference to the accompanying drawings in which some embodiments are illustrated. In the Figures, the thicknesses of lines, layers and/or regions may be exaggerated for clarity.

In the following description of the accompanying figures, which only show a few exemplary embodiments, like references may designate like or comparable components. Moreover, summarizing references may be used for components and objects that occur more than once in an embodiment or in a drawing, but are described together with regard to one or more features. Components or objects which are described with like or summarizing reference numbers may be identical with regard to individual, several or all features, for example their dimensioning, but may also be designed differently, provided that the description does not explicitly or implicitly state otherwise.

Although embodiments can be modified and altered in various ways, embodiments are illustrated as examples in the figures and are described in detail herein. However, it should be made clear that it is not the intention to limit embodiments to the respective forms disclosed, but rather that embodiments should cover all functional and/or structural modifications, equivalents and alternatives that lie within the scope of the invention. Like references refer to like or similar elements throughout the description of the figures.

It is noted, that an element which is referred to a being "connected" or "coupled" to another element, may be directly connected or coupled to the other element or that intervening elements may be present.

The terminology used herein only serves for the description of specific embodiments and should not limit the embodiments. As used herein, the singular forms such as "a," "an" and "the" also include the plural forms, as long as the context does not clearly indicate otherwise. It will be further understood that the terms such as e.g. "comprises," "comprising," "includes" and/or "including," as used herein, specify the presence of the stated features, integers, steps, operations, elements and/or components, but do not preclude the presence or addition of one and/or more other features, integers, steps, operations, elements, components and/or any group thereof.

Unless otherwise defined, all terms (including technical and scientific terms) are used herein in their ordinary meaning of the art to which the examples belong and given to same by a person of ordinary skill in the art. It is further clarified that terms like e.g. those defined in generally used dictionaries are to be interpreted to have the meaning consistent with the meaning in the context of relevant technology, as long as it is not expressly defined otherwise herein.

Figure 1:
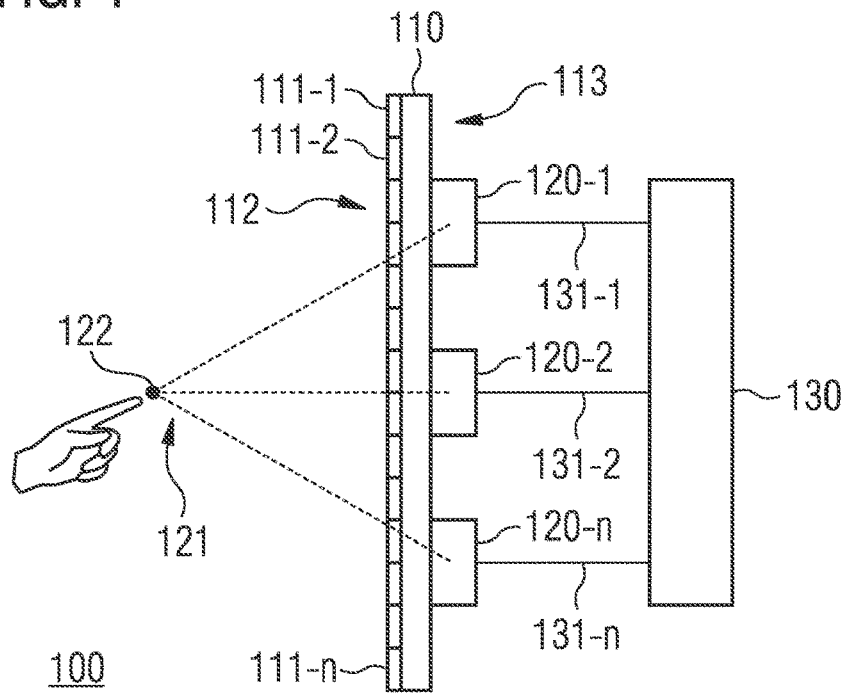
FIGS. 1 to 3 show embodiments of a display device.

FIG. 1 shows a display device 100. The display device 100 includes an optical structure 110 with a plurality of pixels 111-1, 111-2, . . . , 111-n configured to generate an optical image on a front side 112 of the optical structure 110. The display device 100 further comprises a plurality of acoustic transducers 120-1, 120-2, . . . , 120-n configured to generate an acoustic field 121 for stimulating the tactile sense of a human person based on a plurality of control signals 131-1, 131-2, . . . , 131-n in a space in front of the front side 112 of the optical structure 110. The plurality of acoustic transducers 120-1, 120-2, . . . , 120-n are located on a back side 113 of the optical structure 110. The display device 100 additionally includes a control circuit 130 configured to generate at least one of the plurality of control signals 131-1, 131-2, . . . , 131-n based on at least one acoustic property of the optical structure 110.

In addition to outputting an optical image via the optical structure 110, the display device 100 may also enable the provision of tactile feedback via the acoustic field 121 generated by the plurality of acoustic transducers 120-1, 120-2, . . . , 120-n. Due to controlling one or more of the plurality of acoustic transducers 120-1, 120-2, . . . , 120-n taking into account the one or more acoustic properties of the optical structure 110, acoustic (sound) distortions and/or modifications of the acoustic waves emitted from the plurality of acoustic transducers 120-1, 120-2, . . . , 120-n can be compensated and/or at least mitigated by the optical structure 110. In other words: One or more of the plurality of control signals 131-1, 131-2, . . . , 131-n are pre-distorted based on the one or more acoustic properties of the optical structure 110, in order to enable compensation and/or reduction of the acoustic distortion of the acoustic waves emitted from the plurality of acoustic transducers 120-1, 120-2, . . . , 120-n that was caused by the optical structure 110. That way, the plurality of acoustic transducers 120-1, 120-2, . . . , 120-n may be arranged on the back side of the optical structure 110 without the acoustic field 121 generated by the plurality of acoustic transducers 120-1, 120-2, . . . , 120-n in the space in front of the front side 112 of the optical structure 110 being negatively affected by the optical structure 110.

Here, the optical structure 110 may be any type of pixelated structure that can actively generate an optical image based on one or more control signals. For example, the optical structure may be a light-emitting diode (LED) display. Here, each one of the pixels may have one or more inorganic and/or organic light-emitting diodes. For example, each pixel may have at least one light emitting diode each to radiate red, green or blue light respectively, based on a control signal. Further the optical structure 110 may include further elements such as one or more internal control circuits for controlling the individual pixels. The pixels as well as the further elements of the optical structure 110 can be arranged e.g. on a carrier substrate of the optical structure 110. The number of pixels can vary depending on the size of the optical structure 110 and/or depending on the desired resolution of the optical structure 110. For example, the optical structure 110 may provide a resolution of 1280×720 pixels, 1920×1080 pixels, 4096×2160 pixels or more.

The front side 112 of the optical structure 110 is the side of the optical structure 110 that faces a user of the display device 100. Accordingly, the back side 113 of the optical structure 110 is the side of optical structure 110 opposite to the front side 112.

The plurality of acoustic transducers 120-1, 120-2, . . . , 120-n are devices which each convert an (electrical) control signal of the plurality of control signals 131-1, 131-2, . . . , 131-n into an acoustic wave and/or a mechanical wave, respectively. For example, that way, acoustic pressure may be generated at a point in the space in front of the front side 112 of the optical structure 110. An acoustic transducer may also be configured, for example, to convert the control signal into an acoustic wave by means of an electromagnetic, an electrodynamic, an electrostatic, a piezoelectric or a piezoresistive effect and to radiate it.

The acoustic waves may be any acoustic waves which are outside the human auditory range. Therefore, for example, at least one of the plurality of acoustic transducers 120-1, 120-2, . . . , 120-n may be configured to radiate acoustic waves with a frequency of at least 25 kHz, 40 kHz, 60 kHz, 100 kHz or more. The ultrasonic waves thus generated by the acoustic transducer are suitable for the generation of the acoustic field 121 for stimulation of the tactile sense of a human person, since they can be finely modulated locally and are outside the human auditory range. As indicated in FIG. 1, a human person can, e.g. by inserting one or more fingers into the acoustic field 121, feel tactile feedback through stimulation of their tactile sense. Here, the acoustic field 121 is the space in front of the front side 112, in which the acoustic waves of the plurality of acoustic transducers 120-1, 120-2, . . . , 120-n propagate and superimpose (constructively as well as destructively).

In order to also be able to use the display device 100 in compact devices (e.g. mobile phone, laptop computer or tablet computer), the individual components of the display device 100 should take up as little installation space as possible. Accordingly, that way, e.g. at least one of the plurality of acoustic transducers 120-1, 120-2, . . . , 120-n may be configured as a MEMS (microelectromechanical system) acoustic transducer. For example, the MEMS acoustic transducer may be formed from a semiconductor material (e.g. silicon).

The plurality of acoustic transducers 120-1, 120-2, . . . , 120-n may be distributed across the back side 113 of the optical device 110. For example, the plurality of acoustic transducers 120-1, 120-2, . . . , 120-n may be attached to the back side 113 of the optical device 110 in the form of a two-dimensional assembly. In some embodiments the plurality of acoustic transducers 120-1, 120-2, . . . , 120-n may be arranged on the back side 113 of the optical structure 110 e.g. in the form of a matrix. In other words: The plurality of acoustic transducers 120-1, 120-2, . . . , 120-n may be arranged in rows and columns.

The control circuit 130 may comprise a processor, a Central Processing Unit (CPU), a Graphics Processing Unit (GPU), a computer, a computer system, an Application-Specific Integrated Circuit (ASIC), an Integrated Circuit (IC), a System on a Chip (SoC), a programmable logics element or a Field Programmable Gate Array (FPGA) comprising a microprocessor on which software for controlling the plurality of acoustic transducers 120-1, 120-2, . . . , 120-n is run according to the principles described herein. Further, the control circuit 130 may comprise one or several memories in which e.g. software for controlling the plurality of acoustic transducers 120-1, 120-2, . . . , 120-n or other data may be stored. As already indicated above, the control circuit may receive or itself generate a plurality of control signals for the plurality of acoustic transducers 120-1, 120-2, . . . , 120-n at acoustic transducers and subsequently modify them in order to generate the plurality of control signals 131-1, 131-2, . . . , 131-n. In other words: The control circuit 130 may be configured to predistort a plurality of control signals for the plurality of acoustic transducers 120-1, 120-2, . . . , 120-n based on the at least one acoustic property of the optical structure 110 in order to generate the plurality of control signals 131-1, 131-2, . . . , 131-n. Pre-distortion may be done digitally as well as analogously.

The at least one acoustic property of the optical structure 110 is a property of the optical structure 110 that describes its interaction with acoustic waves. For example, the at least one acoustic property of the optical structure 110 may be the acoustic transparency of the optical structure 110. The acoustic transparency here describes the optical structure's measure of permeability for acoustic waves. At a location with high acoustic transparency, an acoustic wave can penetrate the optical structure 110 without and/or without significant distortions, whereas at a location with low acoustic transparency the optical structure 110 can strongly distort the acoustic wave and/or be impenetrable to it.

The optical image generated on the front side 112 of the optical structure 110 may be a still image or an individual image of a sequence of images (e.g. a video).

The acoustic field 121 may be associated with an object in the optical image generated on the front side 112 of the optical structure 110. Basically, the object may be any object that can be illustrated in an optical image. For example, the object may be a switch, button, slider, or rotary knob illustrated in the optical image.

Accordingly, the control circuit 130 may be configured to generate the plurality of control signals 131-1, 131-2, . . . , 131-n based on a state of the object in the optical image. Accordingly, the acoustic field 121 may be adapted to the state of the object in the optical image. If the object in the optical image moves, for example, in a plane parallel to the front side 112 of the optical structure 110, the control circuit 130 may generate the plurality of control signals 131-1, 131-2, . . . , 131-n such that the acoustic field 121 generated by the plurality of acoustic transducers 120-1, 120-2, . . . , 120-n also recreates a movement in a plane parallel to the front side 112 of the optical structure 110. For example, a position of a focus point 122 of the acoustic field 121 may be adjusted depending on a position of the object in the optical image by corresponding control signals 131-1, 131-2, . . . , 131-n of the control circuit 130. The focus point 122 here is the point of the acoustic field 121 at which at least a part of the acoustic waves radiated from the plurality of acoustic transducers 120-1, 120-2, . . . , 120-n superimposes, so that the resulting acoustic pressure and/or a variation thereof at this point is sufficient for targeted stimulation of a human person's tactile sense. Here, one or more focus points may be associated with an individual object. Accordingly, several focus points may also be associated with several objects in the optical image.

For example, if the object is a virtual button displayed in the optical image, which has been pressed by a user input of a user, this may be tactilely indicated to the user e.g. by a change in a vertical distance of the focus point 122 of the acoustic field 121 to the front side 112 of the optical structure 110. Depending on the vertical distance of the focus point 122 of the acoustic field 121 to the front side 112 of the optical structure 110, the user can thus tell whether the virtual button is pressed or not.

Correspondingly, with a virtual rotary knob displayed in the optical image, e.g. the focus point 122 of the acoustic field 121 can follow the rotary movement (i.e. the focus point also makes a rotary movement). When the virtual rotary knob has reached a stop, this may be tactilely indicated to a user by the focus point 122 of the acoustic field 121 remaining at a position associated with the stop of the rotary knob. In addition, e.g. an acoustic pressure or an acoustic pressure variation may be increased upon reaching the stop, to indicate that the stop has been reached.

Thereby, the focus point 122 of the acoustic field 121 may be configured both close to the front side 112 of the optical structure 110 as well as at some distance from it. For example, the control circuit 130 may be configured to generate the plurality of control signals 131-1, 131-2, . . . , 131-n such that the focus point 122 of the acoustic field 121 has a vertical distance of less than 2 cm, 1 cm, 5 mm or less to the front side 112 of the optical structure 110. Alternatively, the control circuit 130 may be configured to generate the plurality of control signals 131-1, 131-2, ..., 131-n such that the focus point 122 of the acoustic field 121 has a vertical distance of at least 1 cm, 2 cm, 5 cm, 10 cm or more to the front side 112 of the optical structure 110.

Additionally, the control circuit 130 may also generate one or more of the plurality of control signals 131-1, 131-2, ..., 131-n based on at least one acoustic property of a substrate (not shown) arranged on the front side 112 of the optical structure 110. The acoustic distortion of the acoustic waves radiated by the plurality of acoustic transducers 120-1, 120-2, ..., 120-n may also be compensated in this way by substrates (e.g. protective layer of glass, etc.) located between the optical structure 110 and the user.

Furthermore, one or more of the plurality of acoustic transducers 120-1, 120-2, ..., 120-n may also be used to receive acoustic information. For example, that way, acoustic waves reflected by a user may be detected in order to recognize a gesture of a user. At least one of the plurality of acoustic transducers 120-1, 120-2, ..., 120-n may thus be further configured to provide an output signal based on received acoustic waves. This output signal may be processed, for example, by the control circuit 130 or another processor circuit. In some embodiments it is possible to switch between the generation of pressure fields and the reception of acoustic information by one or more of the plurality of acoustic transducers 120-1, 120-2, ..., 120-n, for example by means of corresponding control sequences.

Figure 2:
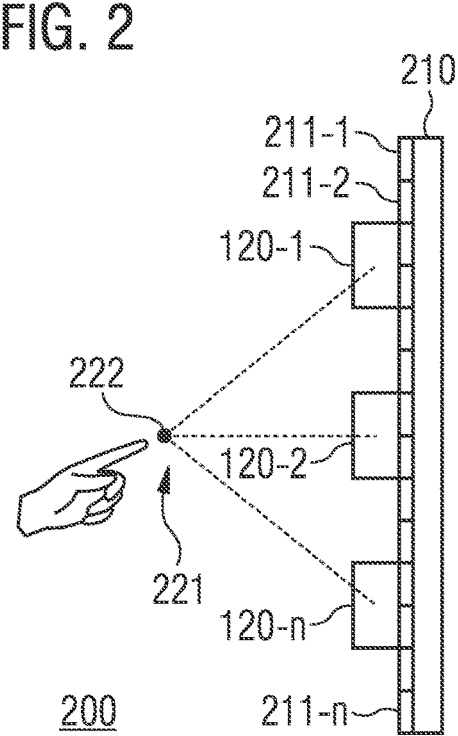

With the display device 100 shown in FIG. 1, the plurality of acoustic transducers 120-1, 120-2, ..., 120-n are arranged on the back side of the optical structure 110. FIG. 2, on the other hand, shows a display device 200 where a plurality of acoustic transducers are arranged on the front side, i.e. the side facing a user, of an optical structure.

The display device 200 includes an optical structure 210 with a plurality of pixels 211-1, 211-2, ..., 211-n configured to generate an optical image on a front side 212 of the optical structure 210. The display device further comprises a plurality of acoustic transducers 220-1, 220-2, ..., 220-n configured to generate an acoustic field 221 for stimulating the tactile sense of a human person in a space in front of the front side 212 of the optical structure. The plurality of acoustic transducers 220-1, 220-2, ..., 220-n are located on the front side 212 of the optical structure 210 and are optically transparent for light with a wavelength in the range of 380 nm to 750 nm.

Like the display device 100, the display device 200 may also enable the provision of a tactile feedback via the acoustic field 221 generated by the plurality of acoustic transducers 220-1, 220-2, ..., 220-n, in addition to outputting an optical image via the optical structure 210. The optical transparency of the plurality of acoustic transducers 220-1, 220-2, ..., 220-n for light with wavelengths in the visible range allows for the arrangement of the plurality of acoustic transducers 220-1, 220-2, ..., 220-n on the front side 212 of the optical structure 210. A distortion of the acoustic waves radiated from the plurality of acoustic transducers 220-1, 220-2, ..., 220-n by the optical structure 210 can thus be avoided. Accordingly, acoustic distortions by the optical structure 210 need not be taken into account when controlling the plurality of acoustic transducers 220-1, 220-2, ..., 220-n.

The optical structure 210 may be set up substantially identically to the optical structure 110 discussed in connection with FIG. 1.

Like the above-mentioned plurality of acoustic transducers 120-1, 120-2, ..., 120-n one or more of the plurality of acoustic transducers 220-1, 220-2, ..., 220-n may also be configured as MEMS acoustic transducers. The plurality of acoustic transducers 220-1, 220-2, ..., 220-n may also be configured to radiate acoustic waves with a frequency of at least 25 kHz, 40 kHz, 60 kHz, 100 kHz or more.

An acoustic transducer of the plurality of acoustic transducers 220-1, 220-2, ..., 220-n is optically transparent for light of a certain wavelength, if the same can penetrate the acoustic transducer substantially unhindered. For example, an acoustic transducer may be considered optically transparent for light of a determined wavelength if it transmits at least 40%, 50%, 60% or 70% of the incoming light of that wavelength.

In order to be optically transparent for light in the range from 380 nm to 750 nm, an acoustic transducer of the plurality of acoustic transducers 220-1, 220-2, ..., 220-n may, for example, comprise a structured glass substrate (e.g. made of borosilicate glass) with one or more electrodes from an indium tin oxide (ITO). In addition, the acoustic transducer may comprise a membrane made of silicon nitride (SiN) or ITO, for example. However, it is obvious that the above-mentioned materials are only exemplary and other optically transparent materials may also be used.

As already discussed in relation to display device 100, the acoustic field 221 may be associated with an object in the optical image generated on the front side 212 of the optical structure 210. Accordingly, the display device 200 may include a control circuit (not shown), which is configured to generate a plurality of control signals based on a state of the object in the optical image. That way, the acoustic field 221 may be adapted to the state of the object in the optical image.

Thereby, the focus point 222 of the acoustic field 221 may in turn be formed both close to the front side 212 of the optical structure 210 and at some distance from it. For example, the control circuit of the display device 200 may be configured to generate the plurality of control signals such that the focus point 222 of the acoustic field 221 has a vertical distance of less than 2 cm, 1 cm, 5 mm or less to the front side 212 of the optical structure 210. Alternatively, the control circuit may be configured to generate the plurality of control signals such that the focus point 222 of the acoustic field 221 has a vertical distance of at least 1 cm, 2 cm, 5 cm, 10 cm or more to the front side 212 of the optical structure 210.

In some embodiments the plurality of acoustic transducers 220-1, 220-2, ..., 220-n may be covered by a substrate (not shown), i.e. the plurality of acoustic transducers 220-1, 220-2, ..., 220-n may be located between a substrate and the optical structure 210. The substrate may, e.g., be a protective layer. Accordingly, the control circuit may generate one or more of the plurality of control signals, also based on at least one acoustic property of the substrate. That way, the acoustic distortion of the acoustic waves radiated by the plurality of acoustic transducers 220-1, 220-2, ..., 220-n may also be compensated by substrates located between the plurality of acoustic transducers 220-1, 220-2, ..., 220-n and the user.

At least one of the plurality of acoustic transducers 220-1, 220-2, ..., 220-n, may, as described above in connection with the plurality of acoustic transducers 120-1, 120-2, ..., 120-n of the display device 100, further be configured to provide an output signal based on received acoustic waves.

Figure 3:
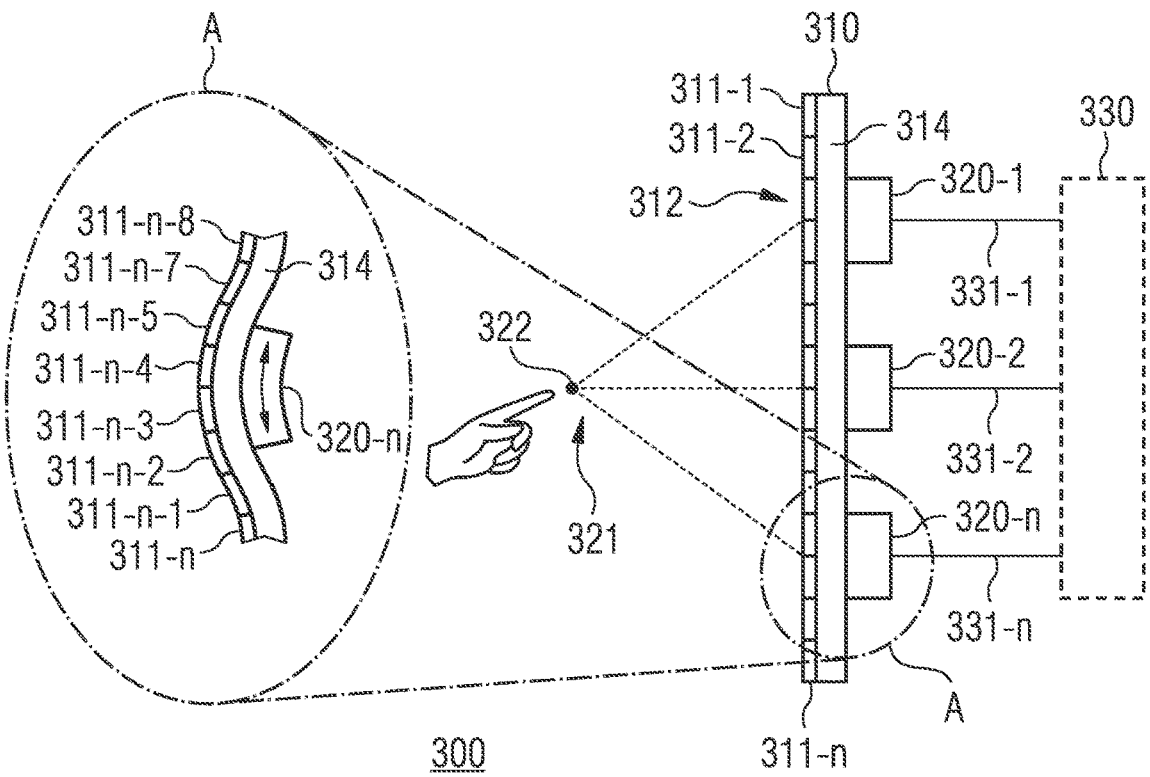

In the two display devices 100, 200 acoustic transducers have been attached externally to an optical structure. However, the optical structure itself may also serve as a source for the acoustic field. For this purpose, FIG. 3 shows the display device 300.

The display device 300 includes an optical structure 310 with a plurality of pixels 311-1, 311-2, ..., 311-n configured to generate an optical image on a front side 312 of the optical structure 310. The plurality of pixels 311-1, 311-2, ..., 311-n are arranged on a carrier substrate 314 of the optical structure 310. The display device 300 further comprises a plurality of electromechanical transducers 320-1, 320-2, ..., 320-n, configured to mechanically deform at least the carrier substrate 314 based on a plurality of control signals 331-1, 331-2, ..., 331-n such that an acoustic field 321 for stimulating the tactile sense of a human person is formed in a space in front of the front side 312 of the optical structure 310 by the mechanical deformation of the carrier substrate 314.

Like the above display devices, the display device 300 may also enable the provision of tactile feedback through the acoustic field 321 generated by the mechanical deformation of the carrier substrate 314, in addition to outputting an optical image via the optical structure 310. Thereby, no external acoustic transducers are necessary to generate the acoustic field, as the optical structure 310 itself serves as acoustic (sound) source.

The optical structure 310 may be set up substantially identically to the above optical structures 110 and 210. However, the optical structure additionally includes the carrier substrate 314.

The excitation of the optical structure 310 by the plurality of electromechanical transducers 320-1, 320-2, ..., 320-n is exemplarily shown in FIG. 3 using the example of the electromechanical transducer 320-n in section A, which magnifies a part of the display device 300. As indicated in FIG. 3, the plurality of electromechanical transducers 320-1, 320-2, ..., 320-n may be arranged on the carrier substrate 314 of the optical structure 310, i.e. in a backside area of the optical structure 310.

The electromechanical transducer 320-n is configured to convert electrical energy into mechanical energy. For example, the electromechanical transducer 320-n may perform a mechanical movement and/or deformation depending on an electrical voltage applied to it or an electrical current applied to it. This conversion process may be based, e.g., on the piezo effect or a capacitive effect. Accordingly, in some embodiments the electromechanical transducer 320-n may be a piezoelectric actuator or a capacitive actuator.

For example, the electromechanical transducer 320-n may perform a length change, depending on the control signal 331-n, as indicated by the arrow in FIG. 3. Due to being attached to the carrier substrate 314, the length change of the electromechanical transducer 320-n causes a part of the carrier substrate 314 to be deformed (e.g. curved as illustrated in FIG. 3). In addition to the carrier substrate 314, further elements of the optical structure may also be deformed by the electromechanical transducer 320-n. This is indicated in FIG. 3 through the deformation of pixels 311-n-3, 311-n-2, ..., 311-n. By deforming at least the carrier substrate 314 with a corresponding frequency using the electromechanical transducer 320-n, the optical structure 310 can be excited to radiate acoustic waves.

By excitation of the optical structure 310 at several locations by the plurality of electromechanical transducers 320-1, 320-2, ..., 320-n, the optical structure 310 can be excited to radiate a plurality of acoustic waves which superimpose in the space in front of the front side 312 of the optical structure 310 and can thus generate an acoustic field 321 to stimulate the tactile sense of a human person.

To generate the plurality of control signals 331-1, 331-2, ..., 331-n, the display device 300 may further include a control circuit 330. For example, the control circuit 330 may be configured to generate at least one of the plurality of control signals 331-1, 331-2, ..., 331-n based on at least one mechanical property of the optical structure 310. Accordingly, the deformation of the carrier substrate 314 and/or the optical structure 310 may be matched to the optical structure 310, so that a distortion of the desired acoustic field by the optical structure 310 may be avoided. The at least one mechanical property is a property that characterizes the deformability of the optical structure 310. For example, it may be a torsion modulus, an elasticity modulus, a Poisson's ratio, a compression modulus, a material or an expansion coefficient of the optical structure 310 or a component thereof.

Here, the plurality of electromechanical transducers 320-1, 320-2, ..., 320-n may be configured to deform at least the carrier substrate based on the plurality of control signals 331-1, 331-2, ..., 331-n such that the optical structure radiates acoustic waves having a frequency of at least 25 kHz, 40 kHz, 60 kHz, 100 kHz or more into the space in front of the front side 312 of the optical structure 310.

As already discussed in relation to the display devices 100 and 200, in the display device 300 the acoustic field 321 may also be associated with an object in the optical image. Accordingly, the control circuit 330 may thus be configured to generate the plurality of control signals 331-1, 331-2, ..., 331-n based on a state of the object in the optical image. In order to avoid repetitions, reference is therefore made to the above statements.

Thereby, the focus point 322 of the acoustic field 321 may in turn be configured both close to the front side 312 of the optical structure 310 as well as at some distance from it. For example, the control circuit 330 may be configured to generate the plurality of control signals 331-1, 331-2, ..., 331-n such that the focus point 322 of the acoustic field 321 has a vertical distance of less than 2 cm, 1 cm, 5 mm or less to the front side 312 of the optical structure 310. Alternatively, the control circuit may be configured to generate the plurality of control signals such that the focus point 322 of the acoustic field 321 has a vertical distance of at least 1 cm, 2 cm, 5 cm, 10 cm or more to the front side 312 of the optical structure 310.

Additionally, the control circuit 330 may also generate one or more of the plurality of control signals 331-1, 331-2, ..., 331-n additionally also based on at least one acoustic property of a substrate (not shown) arranged on the front side 312 of the optical structure 310. The acoustic distortion of the acoustic waves radiated by the optical structure 310 may also be compensated in this way by substrates (e.g. protective layer of glass, etc.) located between the optical structure 310 and the user.

At least one of the plurality of acoustic transducers 320-1, 320-2, ..., 320-n, may, as described above in connection with the plurality of acoustic transducers 120-1, 120-2, ..., 120-n of the display device 100, further be configured to provide an output signal based on received acoustic waves.

Figure 4:
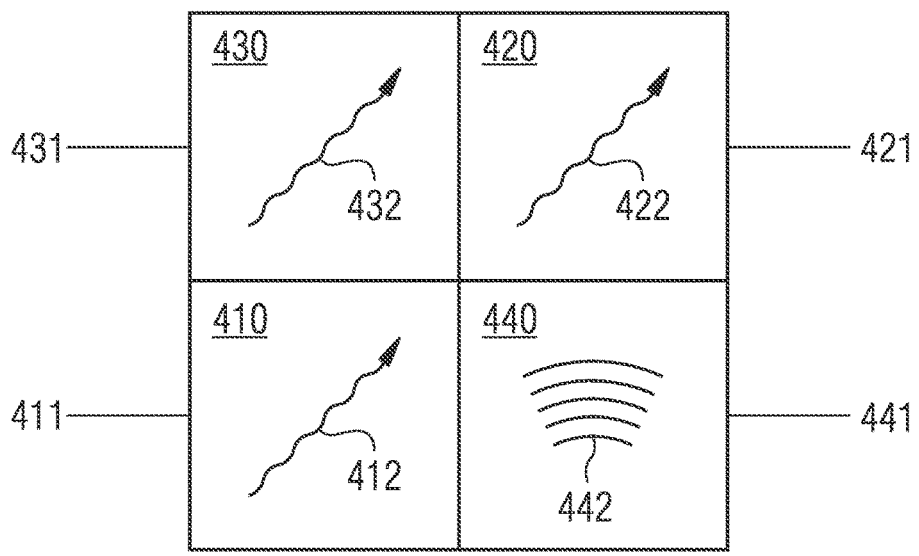
FIG. 4 shows an embodiment of a pixel for a display device.

The radiation of acoustic waves may, however, also be integrated into the optical structure. This is shown in FIG. 4, which shows a pixel 400 for a display device. The pixel 400 includes a first subpixel 410 configured to radiate red light 412 based on a first control signal 411. In addition, the pixel 400 includes a second subpixel 420 configured to radiate blue light 422 based on a second control signal 421. The pixel 400 further includes a third subpixel 430 configured to radiate green light 432 based on a third control signal 431. The pixel 400 further includes an acoustic transducer 440 configured to radiate acoustic waves based on a fourth control signal 441.

The Pixel 400 may enable the display of optical information via the radiation of red, green and blue light 412, 422, 432 as well as enable that of tactile information via the radiation of acoustic waves 442. The set-up of display devices with tactile feedback may be generally simplified by integration of the acoustic transducer 440 into the pixel 400.

Subpixels 410, 420, 430 may each include a light emitting diode that emits red, blue and/or green light. Alternatively, subpixels 410, 420, 430 may also each include a light emitting diode that emits blue light, wherein subpixels 410 and 430 then additionally include a conversion element in order to convert the blue light of the light emitting diode to red and/or green light, respectively. The light emitting diodes may include organic and/or inorganic semiconducting materials, for example. By means of additive color mixing of the red, green and blue light 412, 422, 432 the pixel 400 can represent a variety of color values (i.e. mixed colors).

In some embodiments the acoustic transducer 440 may in turn be a MEMS acoustic transducer. The acoustic transducer 440 may hereby be designed to radiate acoustic waves with a frequency of at least 25 kHz, 40 kHz, 60 kHz, 100 kHz or more.

The acoustic transducer 440, may, as described above in connection with the plurality of acoustic transducers 120-1, 120-2, ..., 120-n of the display device 100, further be configured to provide an output signal based on received acoustic waves.

Figure 5:
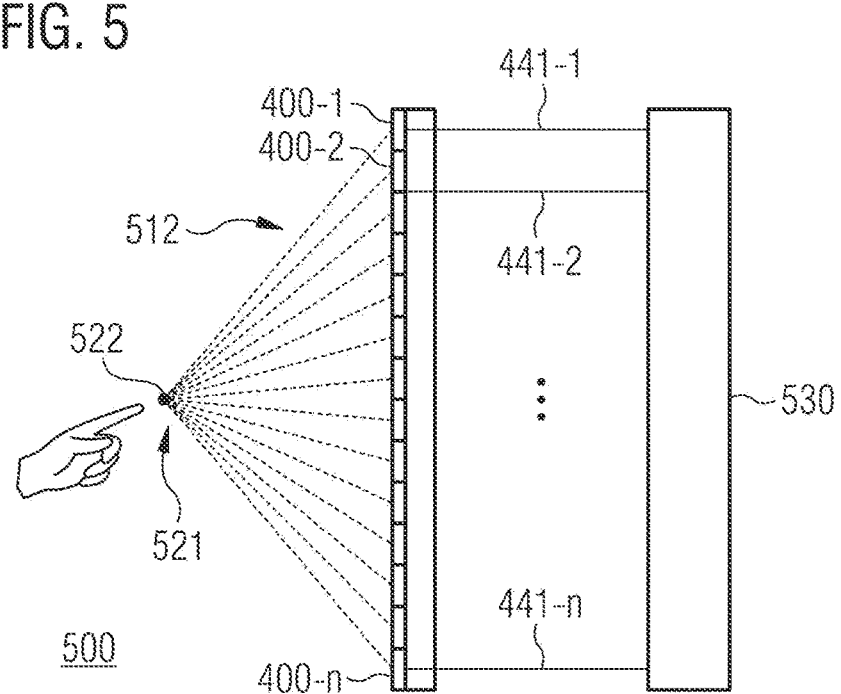
FIG. 5 shows an embodiment of a display device comprising the pixel shown in FIG. 4.

An implementation of the pixel 400 in a display device 500 is shown in FIG. 5. The display device 500 comprises a plurality of pixels 400-1, 400-2, ..., 400-n described in connection with FIG. 4. The plurality of pixels 400-1, 400-2, ..., 400-n are configured to generate an optical image on a front side 512 of the display device 500. The display device 500 further includes a control circuit 530 configured to generate a plurality of fourth control signals 441-1, 441-2, ..., 441-n for the plurality of pixels 400-1, 400-2, ..., 400-n such that the acoustic transducers of the plurality of pixels 400-1, 400-2, ..., 400-n generate an acoustic field 521 for stimulating the tactile sense of a human person in a space in front of the front side 512 of the display device 500.

In addition to outputting an optical image, the display device 500 may also enable the provision of tactile feedback via the acoustic field 521 generated by the acoustic transducers of the plurality of pixels 400-1, 400-2, ..., 400-n.

As already discussed above in relation to the display devices 100, 200 and 300, the acoustic field 521 and/or a focus point 522 of the acoustic field 521 may be associated with an object in the optical image. The control circuit 530 may thus in turn be configured to generate the plurality of fourth control signals 441-1, 441-2, ..., 441-n based on a state of the object in the optical image.

In some embodiments the plurality of pixels 400-1, 400-2, ..., 400-n may be covered by a substrate (not shown). In other words: In some embodiments the plurality of pixels 400-1, 400-2, ..., 400-n may radiate the acoustic waves through a substrate into the space in front of the front side of the display device 500. The substrate may, e.g., be a protective layer. Accordingly, the control circuit 530 may generate one or more of the plurality of fourth control signals 441-1, 441-2, ..., 441-n, also based on at least one acoustic property of the substrate. That way, the acoustic distortion of the acoustic waves radiated by the plurality of pixels 400-1, 400-2, ..., 400-n may also be compensated by substrates located between the plurality of pixels 400-1, 400-2, ..., 400-n and the user.

Thereby, the focus point 522 of the acoustic field 521 may in turn be configured both close to the front side 512 of the display device 500 as well as at some distance from it. For example, the control circuit 530 may be configured to generate the plurality of fourth control signals 441-1, 441-2, ..., 441-n such that the focus point 522 of the acoustic field 521 has a vertical distance of less than 2 cm, 1 cm, 5 mm or less to the front side 512 of the display device 500. Alternatively, the control circuit may be configured to generate the plurality of control signals such that the focus point 522 of the acoustic field 521 has a vertical distance of at least 1 cm, 2 cm, 5 cm, 10 cm or more to the front side 512 of the display device 500.

Figure 6:
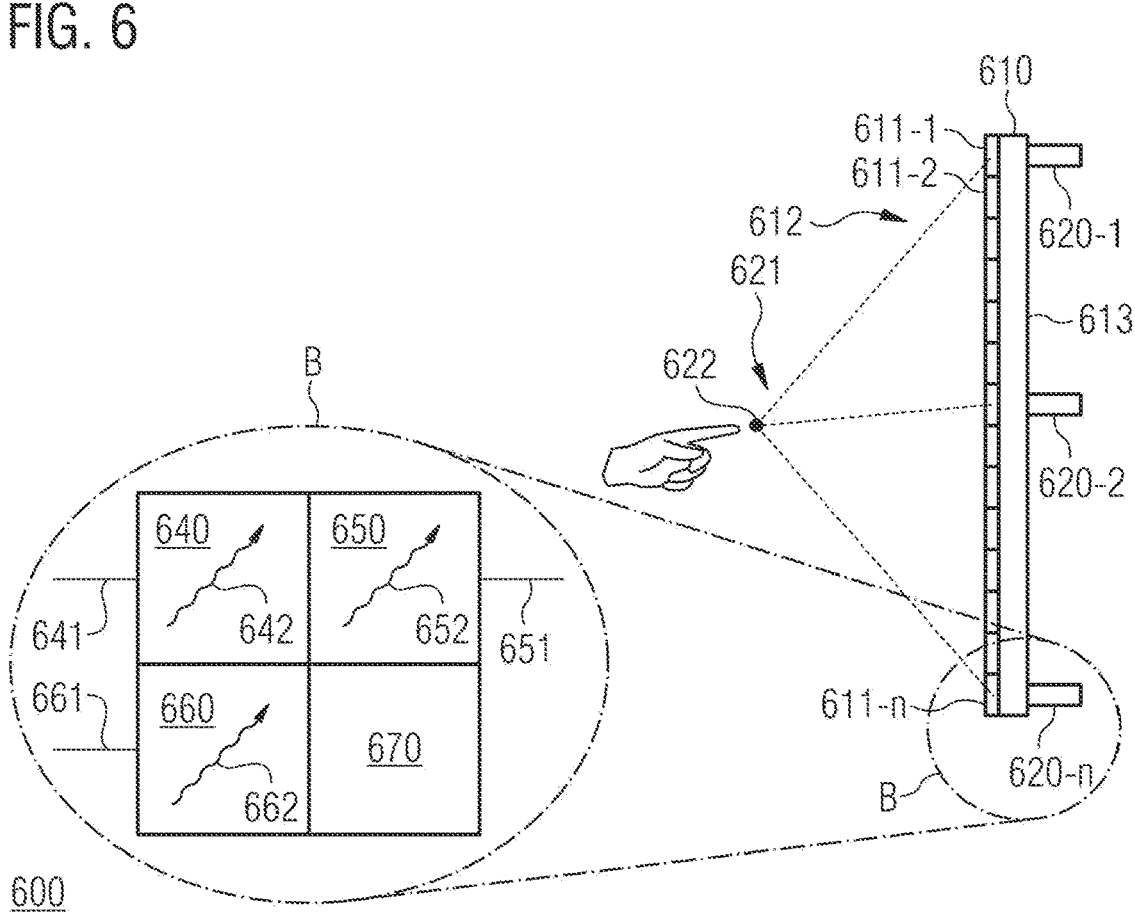
FIG. 6 shows a further embodiment of a display device.

Finally, a further display device 600 is shown in FIG. 6. The display device includes an optical structure 610 with a plurality of pixels 611-1, 611-2, ..., 611-n configured to generate an optical image on a front side 612 of the optical structure 610. At least one of the plurality of pixels 611-1, 611-2, ..., 611-n (for example pixel 611-n) includes a first subpixel 640 configured to radiate red light 642 based on a first control signal 641. The pixel further includes a second subpixel 650 configured to radiate blue light 652 based on a second control signal 651. The pixel further includes a third subpixel 660 configured to radiate green light 662 based on a third control signal 661 and an acoustically transparent area 670. The display device 600 further includes a plurality of acoustic transducers 620-1, 620-2, ..., 620-n configured to generate an acoustic field 621 for stimulating the tactile sense of a human person in a space in front of the front side 612 of the optical structure 610. One of the plurality of acoustic transducers 620-1, 620-2, ..., 620-n (for example acoustic transducer 620-n) is arranged on a back side 613 of the optical structure 610 such that an area of the acoustic transducer, in which it radiates acoustic waves, at least partially covers the acoustically transparent area 670 of the pixel.

Like the above display devices, the display device 600 may also enable the provision of a tactile feedback via the acoustic field 621 generated by the plurality of acoustic transducers 620-1, 620-2, ..., 620-n, in addition to outputting an optical image via the optical structure 610. A distortion of the acoustic waves radiated from the one acoustic transducer of the plurality of acoustic transducers 620-1, 620-2, ..., 620-n by the optical structure 610 may be avoided by positioning the acoustic transducer flush with the acoustically transparent area 670 of the pixel on the back side 613 of the optical structure. Accordingly, acoustic distortions caused by the optical structure 610 need not and/or hardly be taken into account when controlling the acoustic transducer.

The further acoustic transducers of the plurality of acoustic transducers 620-1, 620-2, ..., 620-n may also each be arranged on a back side 613 of the optical structure 610 in such a way that a respective area of the acoustic transducers, in which these radiate acoustic waves, at least partially covers an acoustically transparent area 670 of one of the plurality of pixels 611-1, 611-2, ..., 611-n at least partially. Correspondingly a distortion of the acoustic waves radiated from the plurality of acoustic transducers 620-1, 620-2, ..., 620-n by the optical structure 610 may be avoided.

The acoustically transparent area 670 of the pixel is an area of the pixel that can be penetrated by an acoustic wave without and/or without significant distortions. For example, the acoustically transparent area 670 may be a recess (e.g. a hole). If the optical structure 610 also includes further elements such as a carrier substrate, areas of those that cover the acoustically transparent area 670 of the pixel may also be acoustically transparent themselves.

Otherwise, the optical structure 610 may be substantially set up the same way as the optical structure 110 described above.

One or more of the plurality of acoustic transducers 620-1, 620-2, . . . , 620-*n* may in turn be configured as MEMS acoustic transducers. The plurality of acoustic transducers 620-1, 620-2, . . . , 620-*n* may also be configured to radiate acoustic waves with a frequency of at least 25 kHz, 40 kHz, 60 kHz, 100 kHz or more.

As already discussed in relation to the above display devices, the acoustic field 621 may be associated with an object in the optical image generated on the front side 612 of the optical structure 610. Accordingly, the display device 600 may include a control circuit (not shown), which is configured to generate a plurality of control signals for the plurality of acoustic transducers 620-1, 620-2, . . . , 620-*n* based on a state of the object in the optical image. That way, the acoustic field 621 may be adapted to the state of the object in the optical image.

Thereby, the focus point 622 of the acoustic field 621 may in turn be configured both close to the front side 612 of the optical structure 610 as well as at some distance from it. For example, the control circuit of the display device 600 may be configured to generate the plurality of control signals such that the focus point 622 of the acoustic field 621 has a vertical distance of less than 2 cm, 1 cm, 5 mm or less to the front side 612 of the optical structure 610. Alternatively, the control circuit may be configured to generate the plurality of control signals such that the focus point 622 of the acoustic field 621 has a vertical distance of at least 1 cm, 2 cm, 5 cm, 10 cm or more to the front side 612 of the optical structure 610.

The control circuit of the display device 600 may generate one or more of the plurality of control signals additionally also based on at least one acoustic property of a substrate (not shown) arranged on the front side 612 of the optical structure 610. The acoustic distortion of the acoustic waves radiated by the plurality of acoustic transducers 620-1, 620-2, . . . , 620-*n* may also be compensated in this way by substrates (e.g. protective layer of glass, etc.) located between the optical structure 610 and the user.

At least one of the plurality of acoustic transducers 620-1, 620-2, . . . , 620-*n*, may, as described above in connection with the plurality of acoustic transducers 120-1, 120-2, . . . , 120-*n* of the display device 100, further be configured to provide an output signal based on received acoustic waves.

Embodiments of the present disclosure thus concern, among other things, a stacked or integrated assembly of optical and acoustic elements. Hereby, both elements may be adapted and matched to each other, with regards to their properties. A spatially and temporally variable pressure field in front of an active optical display can be generated with this assembly.

For example, a two-dimensional assembly of ultrasonic transducers may be positioned behind an active optical display. Hereby, a correction of control of the individual ultrasonic transducers to suppress the distortion in the acoustic field may be carried out using the acoustic properties of the optical display. The individual ultrasonic transducers may also be adapted to the acoustic properties of the optical display; in particular, the optical displays may serve as an acoustic matching layer for the ultrasonic transducers located behind them. For example, the ultrasonic transducers may be set up as an array. The ultrasonic array may also be set up using microsystem technology methods.

For example, a two-dimensional assembly of ultrasonic transducers may also be positioned in front of an active optical display. Here, the ultrasonic transducers are constructed from optically transparent material.

An active optical display may also be used as an acoustic source. For example, the acoustic source may be structured behind the optical display via laterally acoustically isolated ultrasonic transducers.

In this way, a temporally and spatially variable pressure field in front of the optical display may be used for tactile feedback. Optical and acoustic systems may form units that are optimally matched to each other. Due to the flat set-up, increasing a thickness of the display only minimally may be accomplished as well. Furthermore, no space laterally next to the optical display may be required for ultrasonic transducers.

The proposed display devices may, for example, be used for mobile terminal devices (e.g. smartphones, laptop computers or tablet computers), the output of computer graphics (e.g. for computer games) or also for control of machines and cooperative robotics.

The following examples pertain to further embodiments:

Example 1 is a pixel for a display device, comprising: a first subpixel configured to radiate red light based on a first control signal; a second subpixel configured to radiate blue light based on a second control signal; a third subpixel configured to radiate green light based on a third control signal; and an acoustic transducer configured to radiate acoustic waves based on a fourth control signal.

Example 2 is a display device, comprising: a plurality of pixels according to example 1, configured to generate an optical image on a front side of the display device; and a control circuit configured to generate a plurality of fourth control signals for the plurality of pixels such that the acoustic transducers of the plurality of pixels generate an acoustic field for stimulating the tactile sense of a human person in a space in front of the front side of the display device.

Example 3 is the display device according to example 2, wherein the acoustic field is associated with an object in the optical image and wherein the control circuit is configured to generate the plurality of fourth control signals based on a state of the object in the optical image.

Example 4 is a display device, comprising: an optical structure with a plurality of pixels configured to generate an optical image on a front side of the optical structure, wherein at least one of the plurality of pixels comprises the following: a first subpixel configured to radiate red light based on a first control signal; a second subpixel configured to radiate blue light based on a second control signal; a third subpixel configured to radiate green light based on a third control signal; an acoustically transparent area; and a plurality of acoustic transducers configured to generate an acoustic field for stimulating the tactile sense of a human person in a space in front of the front side of the optical structure, wherein one of the plurality of acoustic transducers is arranged on a back side of the optical structure, such that an area of the acoustic transducer, in which it radiates acoustic waves, at least partially covers the acoustically transparent area.

Example 5 is the display device according to example 4, wherein the acoustically transparent area is a recess.

The features disclosed in the above description, the subsequent claims and the accompanying figures may, either individually or in any combination, be of importance or implemented for the realization of an embodiment in their different designs.

Although some aspects have been described in connection with a device, it is understood that these aspects also represent a description of the corresponding process, so that a block or component of a device is also to be understood as a corresponding method step or as a feature of a method step. Similarly, aspects described in connection with or as a method step also represent a description of a corresponding block or detail or feature of a corresponding device.

The embodiments described above are merely an illustration of the principles of the present invention. It is understood that modifications and variations of the arrangements and the details described herein will be apparent to others skilled in the art. Therefore, it is intended that the invention is limited only by the scope of protection of the claims below and not by the specific details presented in the description and explanation of the embodiments herein.

The invention claimed is:

1. A display device, comprising:
an optical structure with a plurality of pixels configured to generate an optical image on a front side of the optical structure;
a plurality of acoustic transducers configured to generate an acoustic field for stimulating the tactile sense of a human person in a space in front of the front side of the optical structure based on a plurality of control signals, wherein the plurality of acoustic transducers are arranged on a back side of the optical structure; and
a control circuit configured to pre-distort at least one of the plurality of control signals based on at least one acoustic property of the optical structure, wherein the control signals compensate for an acoustic distortion of the acoustic field.

2. The display device according to claim 1, wherein the control circuit is configured to pre-distort all of the plurality of control signals based on the at least one acoustic property of the optical structure.

3. The display device according to claim 1 wherein the acoustic field is associated with an object in the optical image.

4. The display device according to claim 3, wherein the control circuit is configured to generate the plurality of control signals based on a state of the object in the optical image.

5. The display device according to claim 1, wherein the control circuit is configured to generate the plurality of control signals such that a focus point of the acoustic field has a vertical distance of at least 2 cm to the front side of the optical structure.

6. The display device according to claim 1, wherein the acoustic property of the optical structure is the acoustic transparency of the optical structure.

7. The display device according to claim 1, wherein at least one of the plurality of acoustic transducers is configured to radiate acoustic waves having a frequency of at least 25 kHz.

8. The display device according to claim 1, wherein the plurality of acoustic transducers are arranged on the back side of the optical structure in the form of a matrix.

9. The display device according to claim 1, wherein at least one of the plurality of acoustic transducers is configured as a MEMS acoustic transducer.

10. The display device according to claim 1, wherein at least one of the plurality of acoustic transducers is further configured to provide an output signal based on received acoustic waves.

11. A display device, comprising:
an optical structure with a plurality of pixels configured to generate an optical image on a front side of the optical structure;
a plurality of acoustic transducers configured to generate an acoustic field for stimulating the tactile sense of a human person in a space in front of the front side of the optical structure, wherein the plurality of acoustic transducers are arranged on the front side of the optical structure, and wherein the plurality of acoustic transducers are optically transparent for light having a wavelength in the range 380 nm to 750 nm.

12. The display device according to claim 11, wherein at least one of the plurality of acoustic transducers is configured as a MEMS acoustic transducer.

13. The display device according to claim 11, wherein at least one of the plurality of acoustic transducers is configured to radiate acoustic waves having a frequency of at least 25 kHz.

14. The display device according to claim 11, wherein the acoustic transducers are controlled by control signals, the device further comprising:
a protective substrate covering the plurality of acoustic transducers; and
a control circuit configured to pre-distort at least one of the plurality of control signals based on at least one acoustic property of the protective substrate, wherein the control signals compensate for an acoustic distortion of the acoustic field.

15. A display device, comprising:
an optical structure with a plurality of pixels configured to generate an optical image on a front side of the optical structure, wherein the plurality of pixels are arranged on a carrier substrate of the optical structure;
a plurality of electromechanical transducers, configured to mechanically deform at least the carrier substrate based on a plurality of control signals such that an acoustic field for stimulating the tactile sense of a human person is formed in a space in front of the front side of the optical structure by the mechanical deformation of the carrier substrate; and
a control circuit configured to generate at least one of the plurality of control signals based on at least one mechanical property of the optical structure, wherein the control signals compensate for a deformation of the carrier substrate and/or the optical structure.

16. The display device according to claim 15, wherein at least one of the plurality of electromechanical transducers is a piezoelectric actuator or a capacitive actuator.

17. The display device according to claim 15, wherein the acoustic field is associated with an object in the optical image and the control circuit is further configured to generate the plurality of control signals based on a state of the object in the optical image.

* * * * *